United States Patent
Takiguchi

(10) Patent No.: US 9,983,657 B2
(45) Date of Patent: May 29, 2018

(54) IMAGE PROCESSING APPARATUS INCLUDING A POWER SUPPLY CONTROL UNIT CONTROL A SUPPLY STATE OF A POWER SOURCE AND METHOD FOR CONTROLLING IMAGE PROCESSING APPARATUS

(71) Applicant: Akira Takiguchi, Kanagawa (JP)

(72) Inventor: Akira Takiguchi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days. days.

(21) Appl. No.: 15/506,878

(22) PCT Filed: Sep. 8, 2015

(86) PCT No.: PCT/JP2015/004571
§ 371 (c)(1),
(2) Date: Feb. 27, 2017

(87) PCT Pub. No.: WO2016/038888
PCT Pub. Date: Mar. 17, 2016

(65) Prior Publication Data
US 2017/0262041 A1    Sep. 14, 2017

(30) Foreign Application Priority Data
Sep. 8, 2014 (JP) ................... 2014-182697

(51) Int. Cl.
*G06F 15/00* (2006.01)
*G06F 1/00* (2006.01)
(Continued)

(52) U.S. Cl.
CPC ....... *G06F 1/3284* (2013.01); *G03G 15/5075* (2013.01); *G06F 1/266* (2013.01)

(58) Field of Classification Search
CPC .... G06F 1/3284; G06F 1/266; G06G 15/5075
(Continued)

(56) References Cited

U.S. PATENT DOCUMENTS

| 6,055,641 A * | 4/2000 | Konaka ................. G06F 1/3209 |
| | | 713/300 |
| 2006/0282506 A1* | 12/2006 | Furuishi ............... G05B 19/052 |
| | | 709/208 |

(Continued)

FOREIGN PATENT DOCUMENTS

| JP | 2005-094679 | 4/2005 |
| JP | 2011-197257 | 10/2011 |

(Continued)

OTHER PUBLICATIONS

International Search Report dated Nov. 2, 2015 in PCT/JP2015/004571 filed on Sep. 8, 2015.
Extended European Search Report dated Jul. 20, 2017.

*Primary Examiner* — Douglas Tran
(74) *Attorney, Agent, or Firm* — Harness, Dickey & Pierce, P.L.C.

(57) ABSTRACT

An image processing apparatus is configured to transit to a communicable power-saving state in which information exchange is possible through a network while power supply to a part of units of the apparatus is stopped. The apparatus includes a connection detection unit configured to detect a connection state of a network cable; and a power supply control unit configured to control a supply state of a power source according to the connection state of the network cable. When the network cable is changed from a connected state to a disconnected state, the power supply control unit controls the supply state of the power source so as to cause the apparatus to transit to a connection detectable power-saving state in which a power supply range is more limited than that in the communicable power-saving state and in (Continued)

which detection of the connection state of the network cable is possible by the connection detection unit.

8 Claims, 7 Drawing Sheets

(51) Int. Cl.
*G06K 1/00* (2006.01)
*G06K 15/00* (2006.01)
*G06F 1/32* (2006.01)
*G03G 15/00* (2006.01)
*G06F 1/26* (2006.01)

(58) Field of Classification Search
USPC .......................................... 358/1.15, 1.14, 1.1
See application file for complete search history.

(56) References Cited

U.S. PATENT DOCUMENTS

| | | |
|---|---|---|
| 2011/0273742 A1 | 11/2011 | Takiguchi |
| 2012/0173896 A1* | 7/2012 | Tanaka ............... G03G 15/5004 713/300 |
| 2012/0257247 A1 | 10/2012 | Yamasaki |
| 2012/0275812 A1 | 11/2012 | Takiguchi |

FOREIGN PATENT DOCUMENTS

| | | |
|---|---|---|
| JP | 2011-235454 | 11/2011 |
| JP | 2012-163911 | 8/2012 |
| JP | 2012-218248 | 11/2012 |

\* cited by examiner

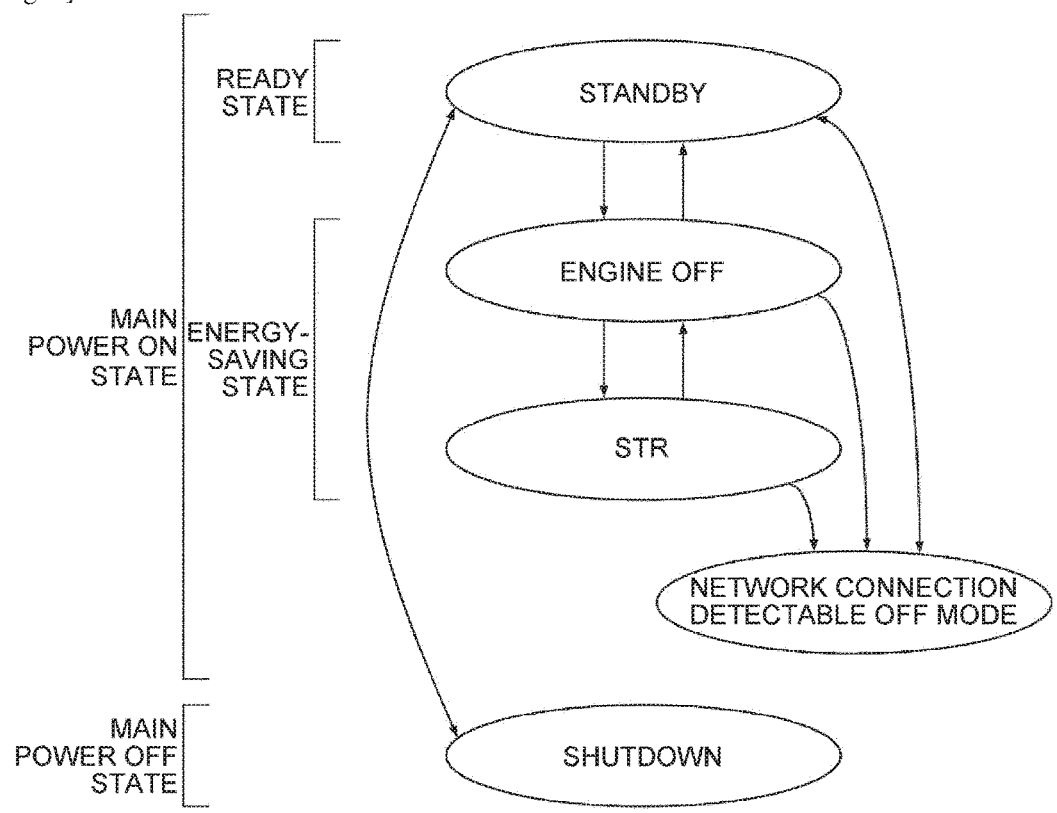
[Fig. 1]

[Fig. 2]
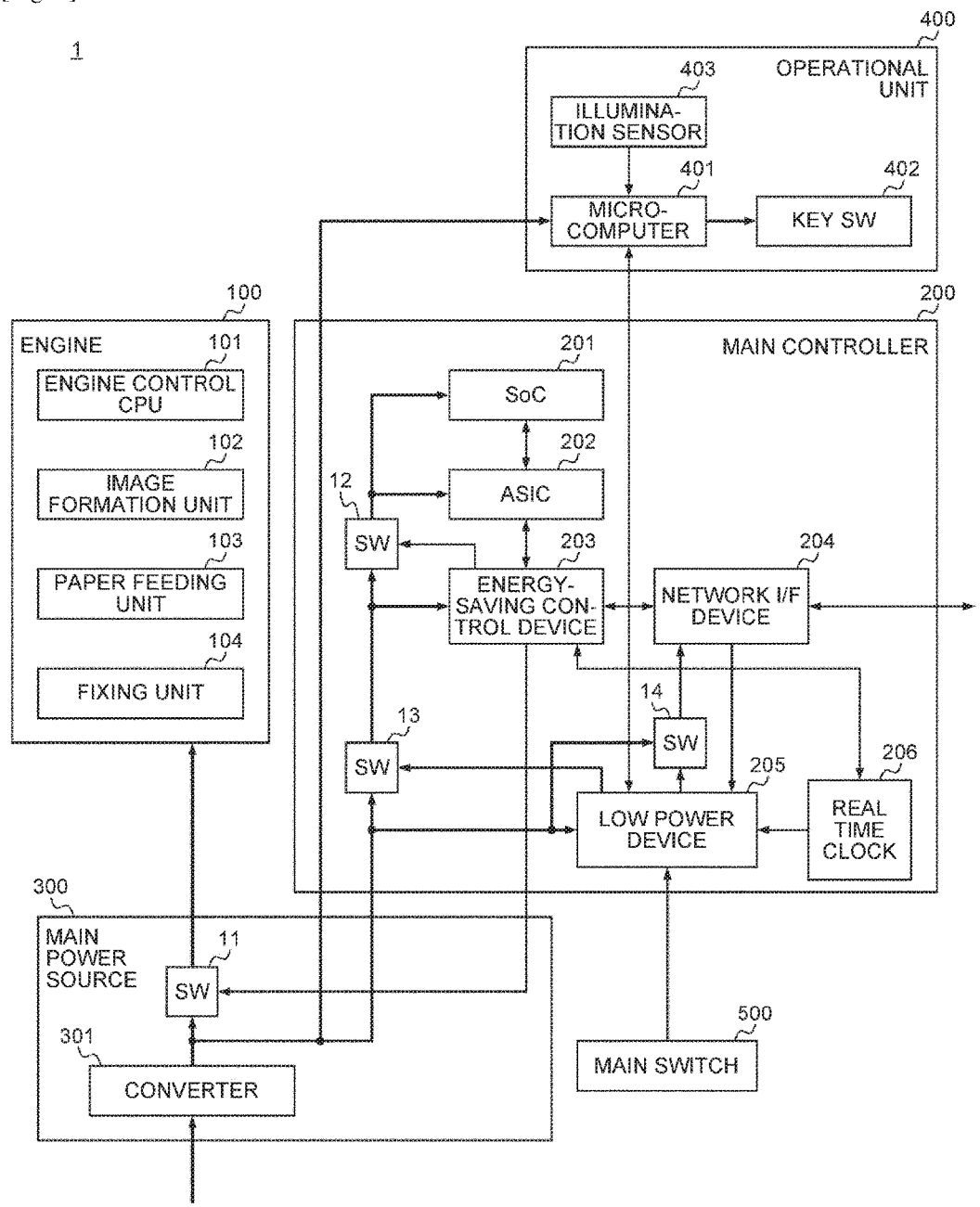

[Fig. 3]
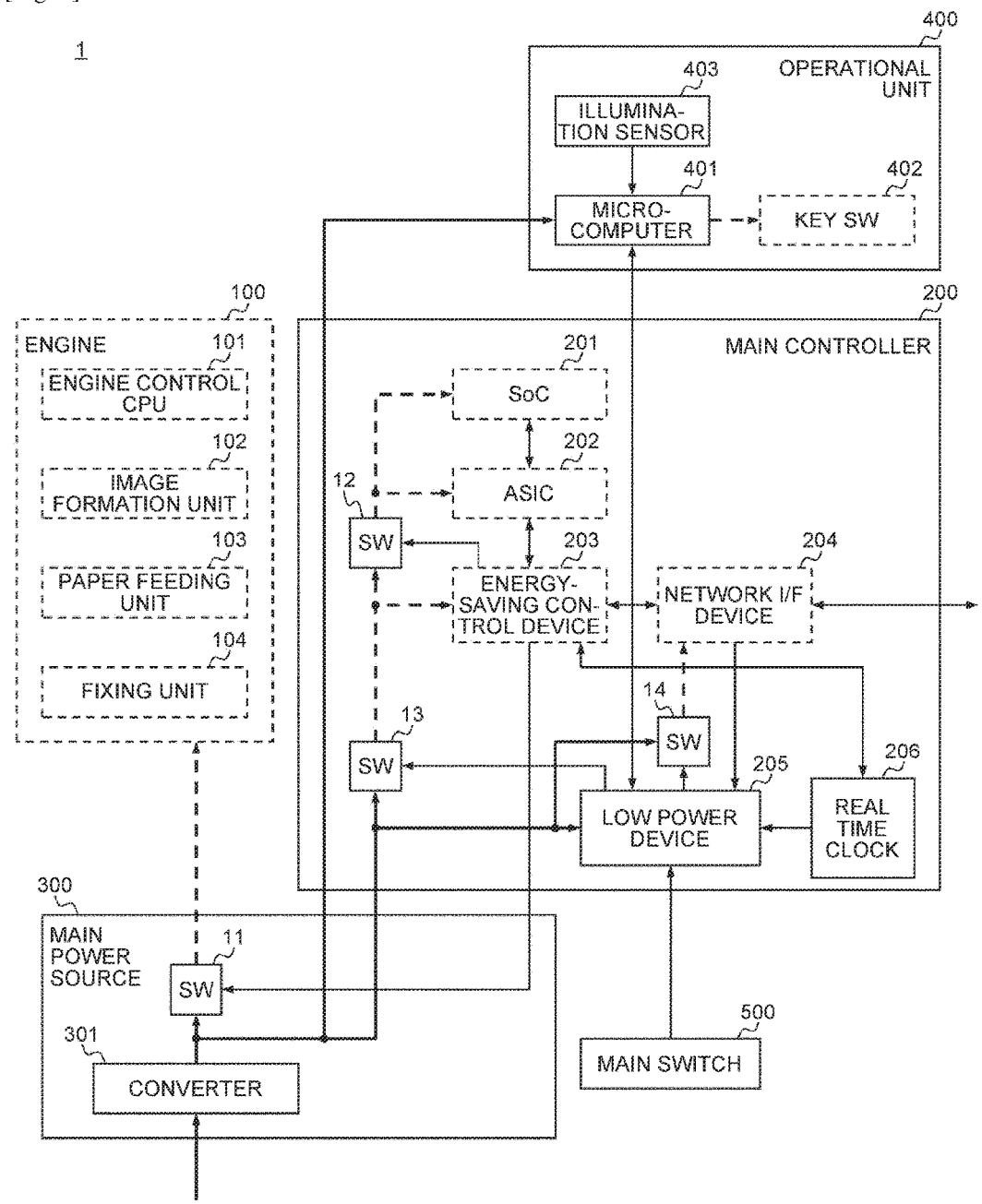

[Fig. 4]
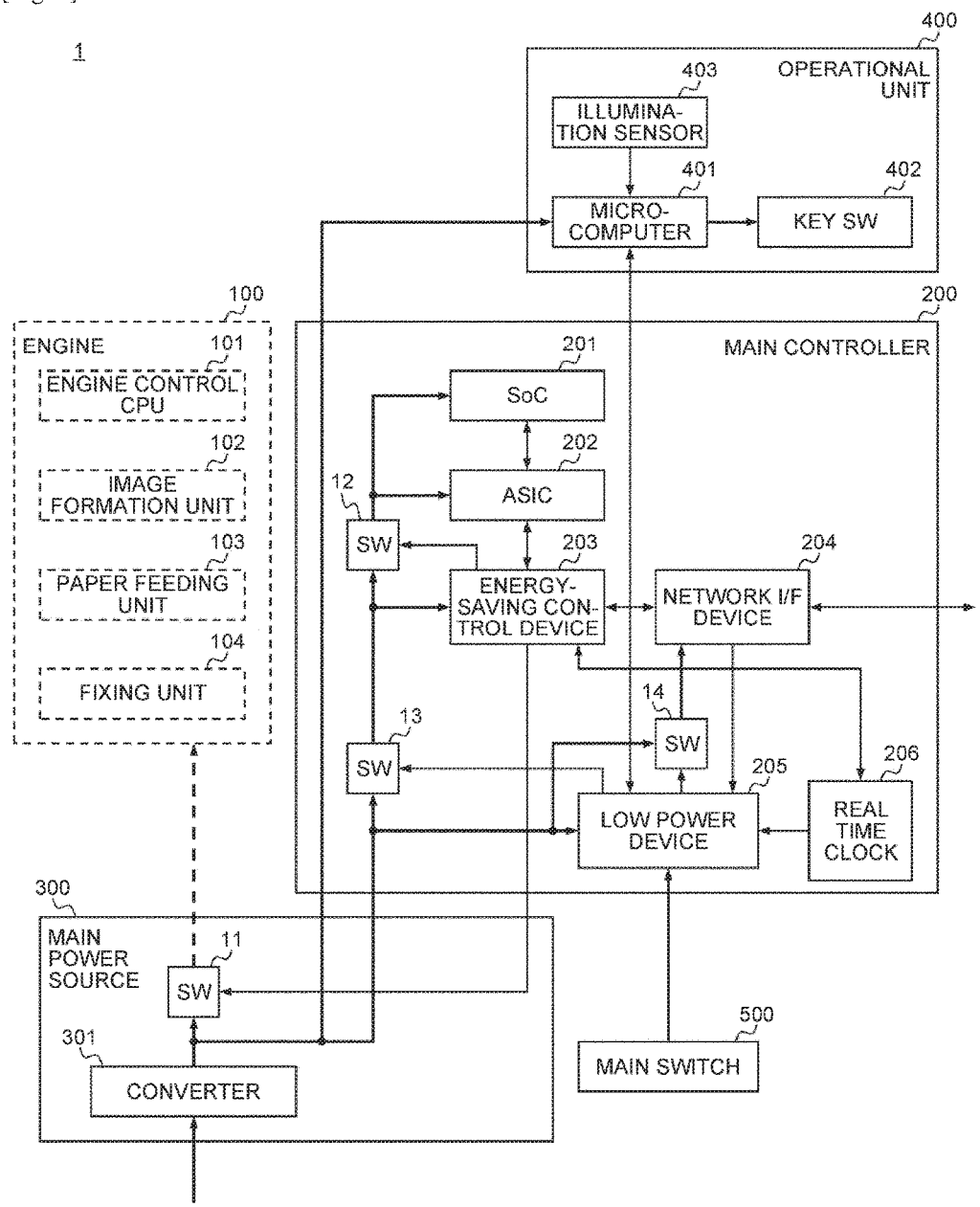

[Fig. 5]
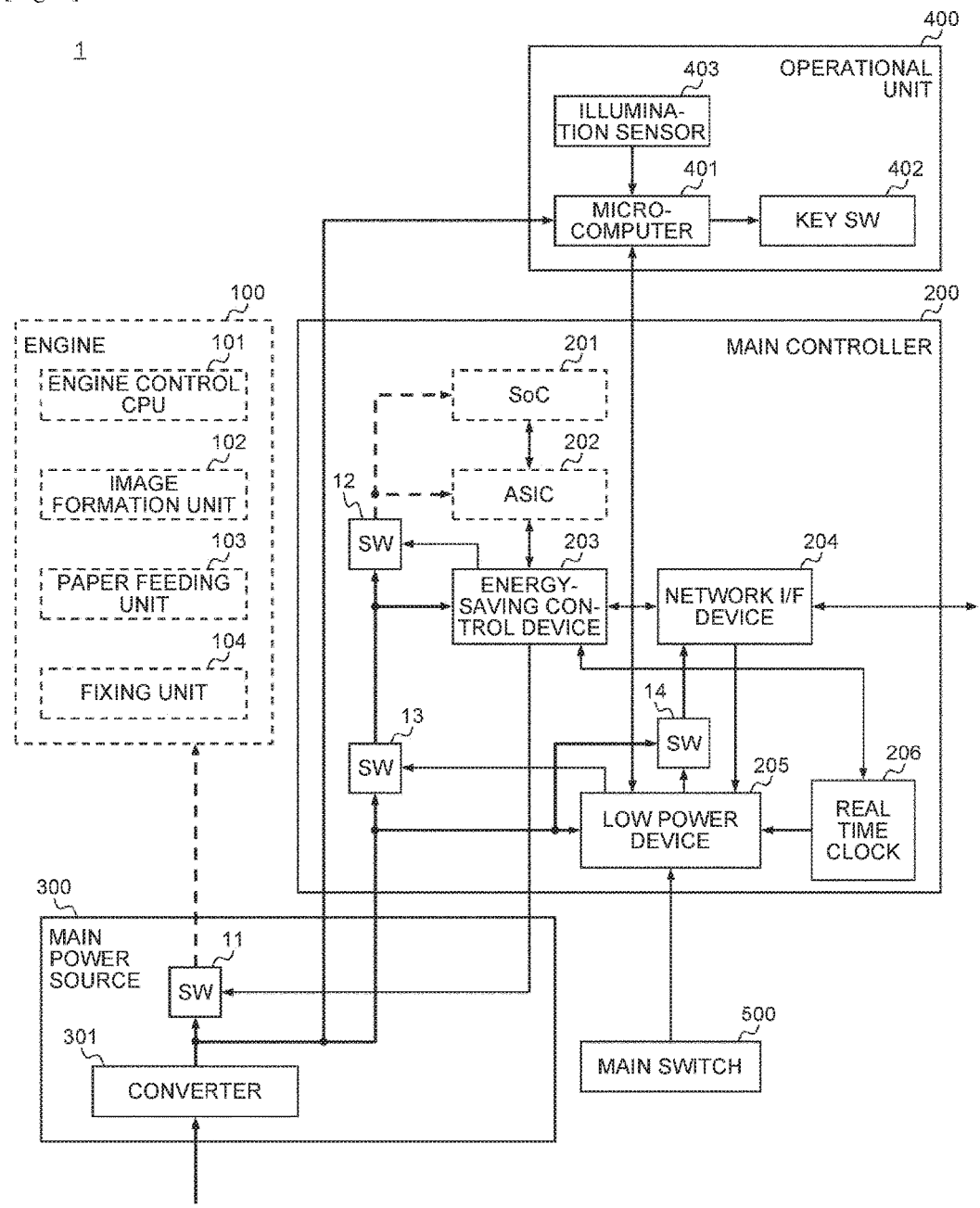

[Fig. 6]
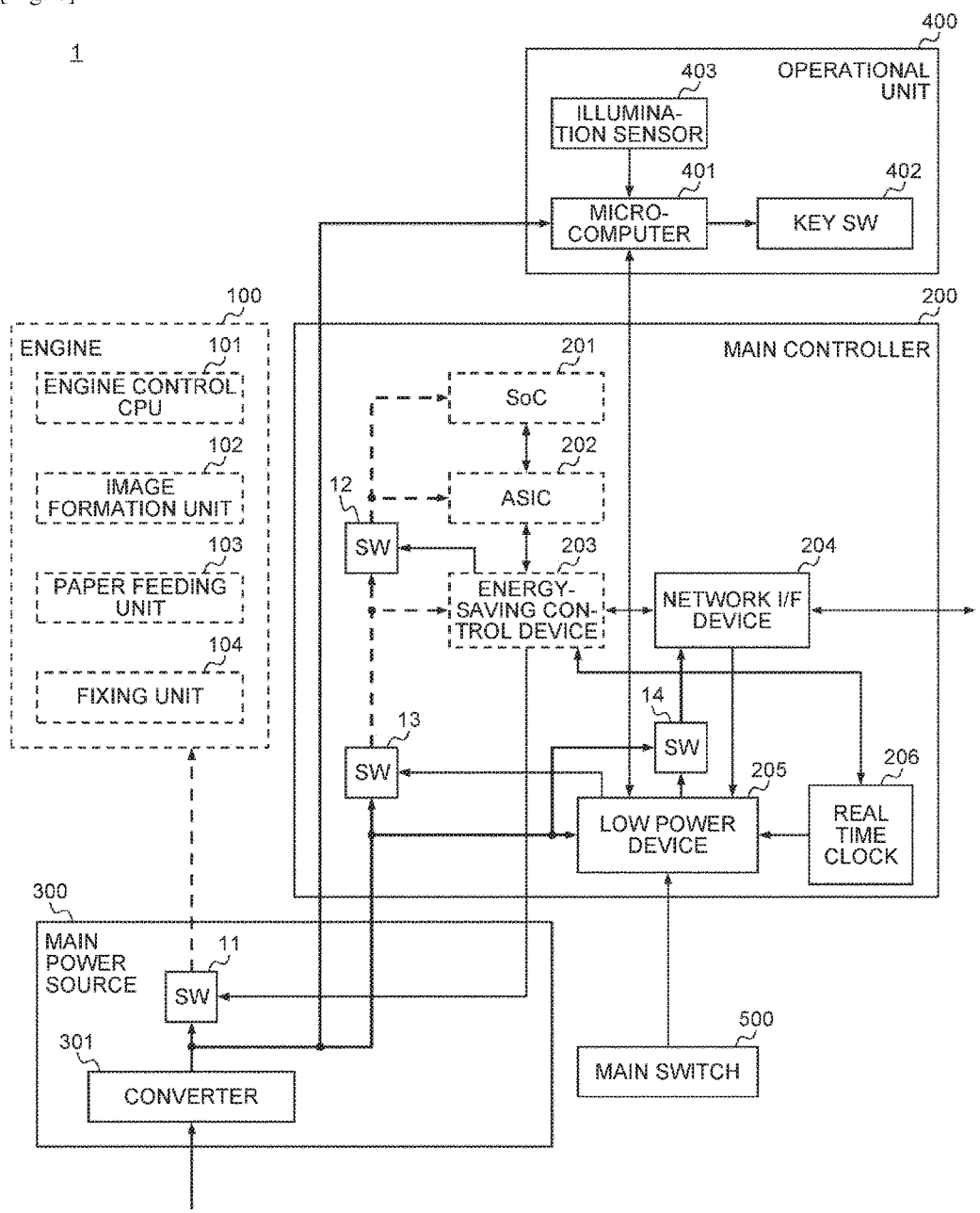

[Fig. 7]
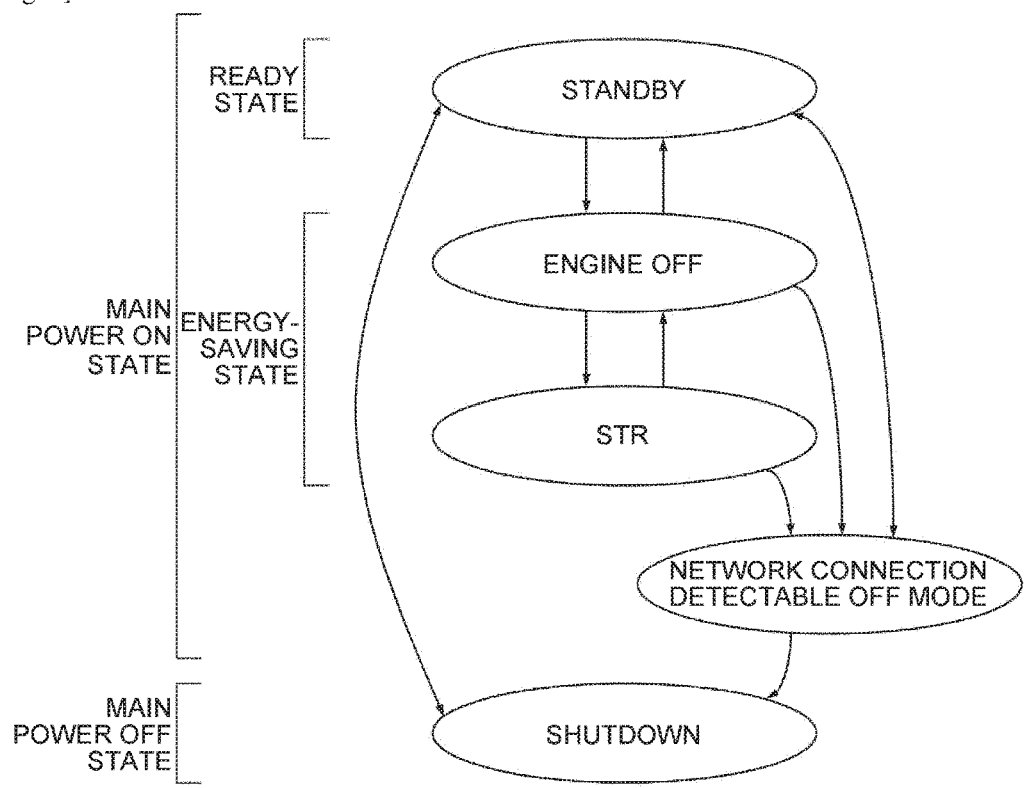

IMAGE PROCESSING APPARATUS INCLUDING A POWER SUPPLY CONTROL UNIT CONTROL A SUPPLY STATE OF A POWER SOURCE AND METHOD FOR CONTROLLING IMAGE PROCESSING APPARATUS

TECHNICAL FIELD

The present invention relates to an image processing apparatus and a method for controlling the image processing apparatus.

BACKGROUND ART

In recent years, there is a trend to advance digitization of information, and an image processing apparatus such as a printer and a facsimile used for outputting digitized information as well as a scanner used for digitizing a document has become an essential apparatus. In such image processing apparatus, reduction of power consumption during non-operating time of the apparatus has been sought after, and there has been used control of a power-saving state in which power supply to a part of the apparatus is stopped.

As an aspect of such control of the power-saving state, there has been proposed a technique of enabling communication with a host PC while reducing the power consumption (see, for example, Patent Literature 1). In this technique, even in an energy-saving mode that achieves specified power consumption, power is supplied to an application specific integrated circuit (ASIC) installed with an interface (I/F) for connecting with the host PC and, by using the ASIC, the communication with the host PC is performed.

SUMMARY OF INVENTION

Technical Problem

As the control of transition to the power-saving state, the transition in response to disconnection of a network cable may be used. In that case, it may be required to keep the power consumption to a predetermined level or below as a standard of a power-saving effect. In the related art, in order to perform return determination according to network communication, the power is continuously supplied to devices including a network I/F even in the power-saving state. Thus, power is needed for that, whereby it is difficult to achieve a strict requirement for reducing the power consumption.

In a case where the apparatus has transited to the power-saving state in response to disconnection of the network cable, return control is required in response to reconnection of the network cable. However, when the power supply to the devices including the network I/F is completely stopped to achieve the power-saving requirement, it is not possible to detect the reconnection of the network cable, whereby it is not possible to perform the return control in response to connection of the cable.

The present invention has been made in view of the above-described actualities, and an object thereof is to enhance the power-saving effect in the power-saving state as well as to enable the return from the power-saving state in response to the connection of the network cable.

Solution to Problem

According to an embodiment, an image processing apparatus is configured to transit to a communicable power-saving state in which information exchange is possible through a network while power supply to a part of units of the apparatus is stopped. The apparatus includes a connection detection unit configured to detect a connection state of a network cable; and a power supply control unit configured to control a supply state of a power source according to the connection state of the network cable. When the network cable is changed from a connected state to a disconnected state, the power supply control unit controls the supply state of the power source so as to cause the apparatus to transit to a connection detectable power-saving state in which a power supply range is more limited than that in the communicable power-saving state and in which detection of the connection state of the network cable is possible by the connection detection unit.

Advantageous Effects of Invention

According to the present invention, it is possible to enhance the power-saving effect in the power-saving state as well as to enable the return from the power-saving state in response to the connection of the network cable.

BRIEF DESCRIPTION OF DRAWINGS

FIG. 1 is a view illustrating transition of a power control state of an image processing apparatus according to an embodiment of the present invention.

FIG. 2 is a view illustrating a control configuration of the image processing apparatus according to the embodiment of the present invention.

FIG. 3 is a view illustrating a power supply state during engine-off time of the image processing apparatus according to the embodiment of the present invention.

FIG. 4 is a view illustrating a power supply state in a STR mode of the image processing apparatus according to the embodiment of the present invention.

FIG. 5 is a view illustrating a power supply state in a network connection detectable off mode according to the embodiment of the present invention.

FIG. 6 is a view illustrating a power supply state during shutdown of the image processing apparatus according to the embodiment of the present invention.

FIG. 7 is a view illustrating transition of a power control state of an image processing apparatus according to another embodiment of the present invention.

DESCRIPTION OF EMBODIMENTS

Hereinafter, an embodiment of the present invention is described in detail with reference to the drawings. In this embodiment, an image processing apparatus that transits to a power-saving state when disconnection of a network cable is detected and that returns from the power-saving state when the network cable is reconnected is described as an example.

FIG. 1 is a view illustrating transition of a power supply state of an image processing apparatus 1 according to this embodiment. As illustrated in FIG. 1, the image processing apparatus 1 according to the embodiment has roughly two states, which are a "main power source on state" and a "main power source off state". In the "main power source on state" of the two states, there are a "ready state" in which the apparatus can be readily used and an "energy-saving state" in which power consumption is reduced but in which a return operation is required when using the apparatus.

The "ready state" refers to a state denoted by "STANDBY" in FIG. 1, and it is a state in which power is supplied to all of units constituting the apparatus. On the other hand, the "energy-saving state" includes two states, which are "engine-off" and "suspend to RAM (STR)". The "engine-off" is a state in which power supply to an engine only is stopped within the apparatus and in which the power consumption is relatively large and image processing is enabled.

On the other hand, the "STR" is a state in which a power supply region is limited so as to enable receiving of a print command through a network, a part of protocol response, acceptance of operation from an operation panel, and the like. In other words, the "STR" is a communicable power-saving state. The "STR" has conventionally been a state with the lowest power consumption among power-saving states in which the apparatus can work without operating a main power source switch.

In the image processing apparatus according to the embodiment, a mode is achieved in which the apparatus can work without operating the main power source switch while further enhancing a power-saving effect from that in the "STR". Note that one standard for enhancing the power-saving effect may be achievement of an AC 0.5 W or below.

As a conventional mode in which the AC 0.5 W is achieved, there is a "shutdown" state, which is the "main power source off state". However, in order to cause the apparatus to transit from the "shutdown" state to an operating state, it is necessary to operate the main power source switch. That is, the "shutdown" state is a non-operating state. In contrast, in the image processing apparatus according to this embodiment, a "network connection detectable off mode" is provided as illustrated in FIG. 1. This makes it possible to perform return control without operating the main power source switch while reducing the power consumption.

As illustrated in FIG. 1, the image processing apparatus can transit to the "network connection detectable off mode" from each of the "standby", "engine-off", and "STR" modes. A trigger of the transition is the disconnection of the network cable from the image processing apparatus. That is, when the image processing apparatus 1 detects the disconnection of the network cable in each of the "standby", "engine-off", and "STR" modes, it transits to the "network connection detectable off mode".

In the "network connection detectable off mode", when the apparatus is changed from a disconnected state to a connected state in response to connection of the network cable, the image processing apparatus detects it and performs return control to the "standby" state. The "network connection detectable off mode" is a state in which the power supply is blocked to most of regions within the apparatus so as to enhance the power-saving effect, and the power supply is also blocked to a device responsible for a communication function.

In contrast, in the "network connection detectable off mode", it is necessary to detect the connection of the network cable. Thus, among devices responsible for the communication function, the power is supplied to a device responsible for a function to receive a physical signal. In other words, in the "network connection detectable off mode", a power supply range is more limited than that in the STR mode, and it is a connection detectable power-saving state in which it is possible to detect the connection state of the network cable. Accordingly, it is possible to perform the return control not by operating the main power source switch but according to insertion of the network cable while enhancing the power-saving effect more than that in the STR mode.

FIG. 2 is a block diagram illustrating a configuration of the image processing apparatus 1 according to the embodiment. As illustrated in FIG. 1, the image processing apparatus 1 according to the embodiment includes an engine 100, a main controller 200, a main power source 300, an operational unit 400, and a main switch 500. In FIG. 1, power supply is denoted by a bold line, and a signal exchange is denoted by a thin line. The engine 100 is hardware responsible for an image forming function in the image processing apparatus 1, and it includes an engine control central processing unit (CPU) 101, an image formation unit 102, a paper feeding unit 103, and a fixing unit 104.

The main controller 200 is a unit responsible for a function to control the whole image processing apparatus 1, and it includes a system on a chip (SoC) 201, an application specific integrated circuit (ASIC) 202, an energy-saving control device 203, a network OF device 204, a low power device 205, and a real time clock 206.

The SoC 201 is a module responsible for a function to control the whole apparatus in the main controller 200. The ASIC 202 is a module responsible for controlling a specific function such as controlling of the engine 100, controlling of the operational unit 400, and the like.

The energy-saving control device 203 relays an information exchange between the ASIC 202 and the network I/F device 204 through the network and also controls the transition in the "energy-saving state" illustrated in FIG. 1. Thus, the energy-saving control device 203 controls a switch (hereinafter, referred to as "SW", SW 11 to SW 14 in the drawings) for switching the power supply to each unit of the apparatus according to the operating state of the apparatus, and switches the power supply state to each of the units of the apparatus such as the engine 100. The energy-saving control device 203 is responsible for a function to respond to the outside in a STR state and performs the return control according to a certain trigger.

The network I/F device 204 is an interface to which the network cable is inserted, and it has a function to detect the physical signal. In addition, in the network I/F device 204 according to the embodiment, the network cable, which has another end side connected to another device, is inserted. Accordingly, in a state where an electric signal is being detected, a signal indicating detection thereof is input to the low power device 205. That is, the network I/F device 204 functions as a connection detection unit.

The low power device 205 is a device within the image processing apparatus 1 that is supplied with the power as long as the main power source 300 is supplied with the power, or as long as the image processing apparatus 1 is connected to a commercial power supply. Based on a signal output according to operation of the main switch 500, the low power device 205 starts the power supply by controlling the SW of each of the units of the apparatus. That is, the low power device 205 functions as a power supply control unit.

The real time clock 206 is a module that counts a real time and outputs a signal to the low power device 205 by counting the set time. The low power device 205 controls the SW according to the signal from each of the network I/F device 204, the real time clock 206, and the main switch 500 to switch the power supply state.

The main power source 300 includes a converter 301 that generates power to be supplied to the units of the image processing apparatus 1 based on the commercial power supply. The operational unit 400 includes a microcomputer 401, a key SW 402, and an illumination sensor 403. The microcomputer 401 is a control unit that controls the operational unit 400 and that also controls the power supply to the key SW 402. The key SW 402 is a hard key used by a user to operate the image processing apparatus 1. The illumination sensor 403 is a sensor that detects brightness around the image processing apparatus 1.

Next, transition among each of the states illustrated in FIG. 1 is described. In the state where the image processing apparatus 1 is connected to the commercial power supply, the apparatus is in the shutdown state. FIG. 3 is a view illustrating the power supply state in the shutdown state. Among power supply lines, a blocked line is denoted by a dashed line, and a block (unit) to which the power is not supplied is enclosed by a dashed-line square.

As illustrated in FIG. 3, in the shutdown state, all of the SW 11, the SW 12, the SW 13, and the SW 14 are blocked, and the power is supplied from the converter 301 only to the low power device 205 of the main controller 200 and the microcomputer 401 of the operational unit 400. Note, however, that the real time clock 206 and the illumination sensor 403 operate unrelated to the power supply from the converter 301.

When the main switch 500 is operated in the shutdown state, the low power device 205 switches the SW 13 and the SW 14 upon receiving a signal from the main switch 500, and the power is supplied to the energy-saving control device 203 and the network I/F device 204. Upon receiving a signal from the low power device 205, the microcomputer 401 starts the power supply to the key SW 402.

Subsequently, the energy-saving control device 203 switches the SW 11 and the SW 12, so that the power is supplied to the engine 100, the SoC 201, and the ASIC 202. Accordingly, the image processing apparatus 1 transits from the shutdown state to the standby state in which the power is supplied to the whole apparatus.

When a transition trigger to an engine-off state such as passing of a predetermined period of time in the standby state occurs, the energy-saving control device 203 blocks the SW 11, and the power supply to the engine 100 is blocked. Accordingly, the image processing apparatus 1 transits to the engine-off state illustrated in FIG. 4.

When a transition trigger to the STR state such as passing of a predetermined period of time from the engine-off state occurs, the energy-saving control device 203 blocks the SW 12, and the power supply to the SoC 201 and the ASIC 202 is blocked. Accordingly, the image processing apparatus 1 transits to the STR state illustrated in FIG. 5.

The state transition from FIG. 2 to FIG. 5 is common control used in a related art. In contrast, the image processing apparatus 1 according to the embodiment has the "network connection detectable off mode", as described above, in response to insertion and extraction of the network cable.

As described above, in the state where the network cable is inserted, the network I/F device 204 outputs a signal indicating the insertion (hereinafter, referred to as a "cable connection signal") to the low power device 205. In contrast, in any of the states illustrated in FIGS. 2, 4, and 5, when the network cable is extracted from the network I/F device 204, the network I/F device 204 stops outputting of the cable connection signal.

When detecting that outputting of the cable connection signal is stopped from the network I/F device 204, the low power device 205 recognizes that the network cable has been extracted and blocks the SW 13. Accordingly, the power supply to the SoC 201, the ASIC 202, and the energy-saving control device 203 is stopped.

By the power supply to the energy-saving control device 203 being stopped, the SW 11 is blocked, and the power supply to the engine 100 is stopped. Accordingly, as illustrated in FIG. 6, transition to the "network connection detectable off mode" in which the power is supplied only to the operational unit 400 and the network I/F device 204 is completed.

In the "network connection detectable off mode", there is no function to respond to the network such as that in the conventional STR mode since the power supply to the energy-saving control device 203 is stopped. Accordingly, the power-saving effect is enhanced more than that in the STR mode. Thus, it is possible to achieve power consumption of AC 0.5 W or below, for example.

The network I/F device 204, as described above, has the function to detect a signal from the network cable and output the cable connection signal to the low power device 205. When the low power device 205 is changed from a state in which the cable connection signal is not input to a state in which the signal is input, the low power device 205 switches the SW 13, and the power is supplied to the energy-saving control device 203.

Subsequently, the energy-saving control device 203 switches the SW 11 and the SW 12, and the power is supplied to the engine 100, the SoC 201, and the ASIC 202. Accordingly, the image processing apparatus 1 transits from the "network connection detectable off mode" to the standby state in which the power is supplied to the whole apparatus.

In this way, when the network cable is extracted, the image processing apparatus 1 according to this embodiment detects the extraction and transits to the "network connection detectable off mode". The "network connection detectable off mode" is a state in which it is capable of detecting reconnection of the network cable while the communication function is suspended. Thus, it is a state in which the power-saving effect is enhanced more than that in the STR mode.

With this configuration, in the image processing apparatus 1 according to this embodiment, it is possible to enhance the power-saving effect in the power-saving state as well as to return from the power-saving state by connecting the network cable.

Note that in the above-described embodiment, a case in which the return control from the "network connection detectable off mode" is performed when the network cable is reinserted has been described as an example. It is also possible to perform the return according to operation on the key SW 402 of the operational unit 400, for example.

The operation on the key SW 402 is transmitted to the microcomputer 401. In the "network connection detectable off mode", since the power is supplied to the operational unit 400, the microcomputer 401 is capable of outputting a signal to the low power device 205 according to the operation on the key SW 402. Thus, the low power device 205 may perform the return from the "network connection detectable off mode" to the standby state according to the signal input from the microcomputer 401 in addition to the cable connection signal.

It is also possible to perform the return automatically according to a count by the real time clock 206. As described above, the real time clock 206 operates unrelated to the power supply from the converter 301. Thus, it is capable of operating in the "network connection detectable off mode". Accordingly, in the "network connection detectable off mode", the low power device 205 is capable of performing the return control to the above-described standby state according to the signal from the real time clock 206.

In the "network connection detectable off mode", the signal is output from the real time clock 206 when it becomes a predetermined time set in advance, when a predetermined period of time has passed since the transition to the "network connection detectable off mode", and the like.

It is also possible to perform the return according to a detection result of brightness by the illumination sensor 403. In the same way as the real time clock 206, the microcomputer 401 and the illumination sensor 403 also operate unrelated to the power supply from the converter 301. Thus, in the "network connection detectable off mode", the low power device 205 is capable of performing the return control to the above-described standby state according to the signal from the microcomputer 401 according to the detection result by the illumination sensor 403.

The detection result by the illumination sensor 403 that causes the microcomputer 401 to output the signal for returning the low power device 205 from the "network connection detectable off mode", for example, may be when it is changed from a dark state to a bright state. The illumination sensor 403 outputs a signal to the microcomputer 401 according to brightness around it such as the brightness in a room where the image processing apparatus 1 is installed.

In a case where the brightness indicated by the signal output from the illumination sensor 403 is changed from a state below a predetermined threshold to over the threshold, the microcomputer 401 determines that the room has become brighter and outputs a signal for returning from the "network connection detectable off mode". By using such processing, it is possible to perform the return control from the "network connection detectable off mode" when the room becomes brighter.

In this way, user's convenience can be improved by providing various return triggers other than the reconnection of the network cable. That is, it is possible to return the apparatus even in a case where a user does not know the state of the apparatus, is not aware that it is in the "network connection detectable off mode", and thus does not think of an action of reinserting the network cable.

Furthermore, in the above-described embodiment, as an example, a case has been described in which a state the apparatus only transits to the "standby" state from the "network connection detectable off mode". However, when the user extracts the network cable and the apparatus is left after transiting into the "network connection detectable off mode", it is preferred that the apparatus transit into the "shutdown" state to further reduce the power consumption. Hereinafter, such control is described.

FIG. 7 is a view illustrating a power supply state when the apparatus transits from the "network connection detectable off mode" to the "shutdown" state. As illustrated in FIG. 7, control of transition from the "network connection detectable off mode" to the "shutdown" state is added. Note, however, that transition from the "shutdown" state is limited to operation of the main switch 500 and thus, in the same way as in FIG. 1, the apparatus only transits to the "standby" state from the "shutdown" state.

As a transition trigger from the "network connection detectable off mode" to the "shutdown" state, it is possible to use the count by the real time clock 206, for example. Specifically, when transiting to the "network connection detectable off mode", the low power device 205 sets the time after a predetermined period of time to the real time clock.

The real time clock 206, when it becomes the set time, outputs a signal indicating that it is the set time to the low power device 205. Based on this signal, the low power device 205 switches the SW 14 and stops the power supply to the network OF device 204 while causing the microcomputer 401 to stop the power supply to the key SW 402. Accordingly, the apparatus transits to the state illustrated in FIG. 3.

In addition to such function of the real time clock 206, it is also possible to use a function of the illumination sensor 403. A detection result by the illumination sensor 403 that causes the microcomputer 401 to output the signal to the low power device 205 for transiting from the "network connection detectable off mode" to the "shutdown" state, for example, may be when it is changed from a bright state to a dark state. As described above, the illumination sensor 403 outputs the signal to the microcomputer 401 according to the brightness around it such as the brightness in a room where the image processing apparatus 1 is installed.

When the brightness indicated by the signal output from the illumination sensor 403 is changed from a state over a predetermined threshold to below the threshold, the microcomputer 401 determines that the room has become darker and outputs a signal for returning from the "network connection detectable off mode". By using such processing, it is possible to perform transition control from the "network connection detectable off mode" to the "shutdown" state when the room becomes darker.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 Image processing apparatus
100 Engine
101 Engine control CPU
102 Image formation unit
103 Paper feeding unit
104 Fixing unit
200 Main controller
201 SoC
202 ASIC
203 Energy-saving control device
204 Network OF device
205 Power-saving device
206 Real time clock
300 Main power source
301 Converter
400 Operational unit
401 Microcomputer
402 Key SW
403 Illumination sensor
500 Main switch

CITATION LIST

Patent Literature

[PTL 1]
Japanese Unexamined Patent Application Publication No. 2005-094679

The invention claimed is:
1. An image processing apparatus configured to transit to a communicable power-saving state in which information exchange is possible through a network while power supply to a part of units of the apparatus is stopped, the apparatus comprising:
    a connection detection unit configured to detect a connection state of a network cable; and
    a power supply control unit configured to control a supply state of a power source according to the connection state of the network cable, wherein
    when the network cable is changed from a connected state to a disconnected state, the power supply control unit is configured to control the supply state of the power source so as to cause the apparatus to transit to a connection detectable power-saving state in which a power supply range is more limited than that in the communicable power-saving state and in which detection of the connection state of the network cable is possible by the connection detection unit, and
    the power supply control unit is configured to control the supply state of the power source, after transition to the connection detectable power-saving state, so as to stop the power supply to the connection detection unit when a predetermined condition is satisfied and to cause the apparatus to transit to a non-operating state from which the apparatus can be started only by operating a main power source switch.

2. The image processing apparatus according to claim 1, wherein
    the power supply control unit is configured to control the supply state of the power source so as to start the power supply to the units of the apparatus when the network cable is changed from the disconnected state to the connected state in the connection detectable power-saving state.

3. The image processing apparatus according to claim 1, wherein
    the power supply control unit is configured to control the supply state of the power source, after transition to the connection detectable power-saving state, so as to stop the power supply to the connection detection unit when a predetermined period of time is passed and to cause the apparatus to transit to the non-operating state from which the image processing apparatus can be started only by operating the main power source switch.

4. The image processing apparatus according to claim 1, wherein
    the power supply control unit is configured to control the supply state of the power source, after transition to the connection detectable power-saving state, so as to stop the power supply to the connection detection unit when brightness around the apparatus becomes darker than a predetermined threshold and to cause the apparatus to transit to the non-operating state from which the apparatus can be started only by operating the main power source switch.

5. The image processing apparatus according to claim 1, wherein
    the power supply control unit is configured to control the supply state of the power source, after transition to the connection detectable power-saving state, so as to start the power supply to the units of the apparatus after a predetermined period of time is passed.

6. The image processing apparatus according to claim 1, wherein
    the power supply control unit is configured to control the supply state of the power source, after transition to the connection detectable power-saving state, so as to start the power supply to the units of the apparatus when the brightness around the apparatus becomes brighter than the predetermined threshold.

7. The image processing apparatus according to claim 1, wherein
    the power supply control unit is configured to control the supply state of the power source, after transition to the connection detectable power-saving state, so as to start the power supply to the units of the apparatus when accepting operation from an operational unit.

8. A method for controlling an image processing apparatus configured to transit to a communicable power-saving state in which information exchange is possible through a network while power supply to a part of units of the apparatus is stopped, the method comprising:
    detecting, by a connection detection unit of the apparatus, a connection state of a network cable;
    controlling, in a case where the network cable is changed from a connected state to a disconnected state, a supply state of a power source so as to cause the apparatus to transit to a connection detectable power-saving state in which a power supply range is more limited than that in the communicable power-saving state and in which detection of the connection state of the network cable is possible; and
    controlling the supply state of the power source, after transition to the connection detectable power-saving state, so as to stop the power supply to the connection detection unit when a predetermined condition is satisfied and to cause the apparatus to transit to a non-operating state from which the apparatus can be started only by operating a main power source switch.

* * * * *